(12) United States Patent
Grunbok, Jr. et al.

(10) Patent No.: US 6,305,603 B1
(45) Date of Patent: Oct. 23, 2001

(54) PERSONAL DIGITAL ASSISTANT BASED FINANCIAL TRANSACTION METHOD AND SYSTEM

(75) Inventors: Warren William Grunbok, Jr., Apalachin; Gilford Francis Martino, Endwell, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,691

(22) Filed: Jan. 29, 1999

(51) Int. Cl.[7] .................................................... G06F 17/60
(52) U.S. Cl. ........................... 235/379; 235/492; 395/892
(58) Field of Search ................................. 235/379, 492; 380/24; 395/892

(56) References Cited

U.S. PATENT DOCUMENTS

| 4,454,414 | 6/1984 | Benton . | |
|---|---|---|---|
| 5,373,561 | * 12/1994 | Haber et al. | 380/24 |
| 5,550,358 | 8/1996 | Tait et al. . | |
| 5,590,197 | 12/1996 | Chen et al. . | |
| 5,649,115 | 7/1997 | Schrader et al. . | |
| 5,668,591 | 9/1997 | Shintani . | |
| 5,744,787 | 4/1998 | Teicher . | |
| 5,748,737 | 5/1998 | Daggar . | |
| 5,778,256 | 7/1998 | Darbee . | |
| 5,811,771 | 9/1998 | Dethloff . | |

FOREIGN PATENT DOCUMENTS

| 0 640 945 A2 | 3/1995 | (EP) . |
| WO 96/18162 | 6/1996 | (WO) . |
| WO 97/31343 | 8/1997 | (WO) . |

* cited by examiner

*Primary Examiner*—Harold I. Pitts
(74) *Attorney, Agent, or Firm*—Schmeiser, Olsen & Watts; Lawrence R. Fraley

(57) ABSTRACT

A personal digital assistant (PDA) based financial transaction method and system. The invention allows for convenient access to financial account(s) from a store and allows for financial transactions and immediate account updates via a PDA.

24 Claims, 3 Drawing Sheets

PERSONAL DIGITAL ASSISTANT BASED FINANCIAL TRANSACTION METHOD AND SYSTEM

BACKGROUND OF THE INVENTION

1. Technical Field

The present invention relates generally to financial electronic transactions and, in particular, to convenient electronic financial transactions and financial account(s) access with immediate account updates via a personal digital assistant (PDA).

2. Related Art

Heretofore, credit cards, automated teller machine (hereafter"ATM"cards and so called smart cards have been used to purchase products and services without the use of cash. Unfortunately, the before mentioned cards suffer from a number of disadvantages. First, they do not provide the ability to use multiple accounts to pay for a transaction. Second, some cards such as credit cards or smart cards do not require an electronic signature or password for access to a users account. Hence, if lost or stolen, the card holders assets can be lost. Third, the above-mentioned cards do not provide feedback for record keeping other than a purchase receipt. The card user, therefore, must remember to enter the amount of purchases into his/her account register and update the account balance. Balance maintenance and budgeting, therefore, are burdensome.

In view of the foregoing, there is a need for a process and system(s) for conveniently conducting multiple financial transactions and automatically updating accounts.

SUMMARY OF THE INVENTION

In a first general aspect of the present invention is provided a method comprising the steps of: accessing at least two financial accounts at at least one financial institution using a personal digital assistant, performing at least one financial transaction during accessing using the personal digital assistant, and transmitting from each financial institution to the personal digital assistant updated information regarding each financial account. The present invention provides a number of advantages over related art devices. First, the process allows access to accounts with immediate updated feedback from the financial institution(s) accessed. This allows the user to access more than one account at one time if necessary and immediately see updated account balances on the personal digital assistant. Hence, the user receives more accurate account information. Additionally, prior to proceeding with a financial transaction, the PDA user may be provided with current financial account information so as to prevent overdrafts and allow for budgeting. Another advantage is found in how the retail institution or other transaction processor would receive immediate payment for goods or services, and potentially without providing a check out clerk or other service representative. Payment would be provided automatically by the PDA user before exiting the store. Accordingly, usage of the present invention could ultimately lead to lower costs to a transaction processor.

In a second general aspect in accordance with the present invention is provided a financial transaction system comprising: a hand held microcomputer electronically communicative with a store computer, the store computer being electronically communicative with at least one financial institution computer. The system further includes means for executing an electronic financial transaction between at least one hand held microcomputer user account at the at least one financial institution and a store account, and for immediately updating account information on the hand held microcomputer after the electronic financial transaction has been completed. This aspect provides a system to carry out the process of the first aspect and provides all of the advantages outlined above.

A third general aspect of the present invention provides a system for performing a financial transaction at a store, the system comprising: a store computer communicative with a store financial institution computer and a hand held computer user financial institution computer. The hand held computer has means for communicating with the store computer, means for initiating a financial transaction between the hand held computer user financial institution and the store financial institution computer via the store computer, and means for receiving financial transaction and account details from the hand held computer user financial institution computer via the store computer. This aspect provides similar advantages as that of the second aspect.

A fourth general aspect of the invention provides a store computer system for performing a financial transaction at a store with a hand held computer, the system comprising: means for communicating with a financial institution of the store and with a financial institution of the hand held computer user, means for communicating with, and performing a financial transaction based on input from, the hand held computer, and means for transmitting financial transaction and updated financial account information from the financial institution of the hand held computer user to the hand held computer. This aspect provides a store system capable of obtaining the above-described advantages.

A fifth general aspect of present invention provides a program storage device readable,by a machine, tangibly embodying a program of instructions executable by the machine to perform the method steps for executing a financial transactions between computer systems, the method steps comprising: accessing at least two financial accounts at at least one financial institution using a personal digital assistant, performing at least one financial transaction during accessing using the personal digital assistant, and transmitting from each financial institution to the personal digital assistant updated information regarding each financial account. This aspect provides a mechanism of storage for instructions to carry out the process outlined above.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

A "personal digital assistant" (hereinafter "PDA") is defined as a hand held microcomputer designed for individual use and includes at least a local central processing unit (CPU), a touch screen (or other equivalent user interface such as a keypad, a screen with mouse, voice recognition system, or pen-based input, etc.), memory for storing information, and input/output capability for reading and writing information. The I/O capability may be to various cards such as smart cards, magnetic cards, or optical cards, etc. The PDA may also include a microphone, a modem, a serial port and/or a parallel port so as to provide direct communication capability with peripheral devices, e.g., point of sale (POS) and automated teller machine (ATM) terminals, and capability for transmitting or receiving information through wireless communications such as radio frequency (RF) and infrared (IR) communications. Examples of such devices are an International Business Machine (IBM) Workpad® or an Apple Newton®.

A "financial institution" is defined as any institution for receiving, lending, exchanging, and safeguarding money, issuing notes and transacting other monetary business. For example, banks, credit card companies, brokerages, etc.

A "transaction processor" or "store" is any establishment in which a person pays for products, services, etc. It is important to recognize that while the term "store" is used throughout to describe the subject invention, the teachings of the invention, as they relate to an establishment receiving payment, are applicable to any establishment that receives payment and should not be limited to a traditionally defined-"store." For instance, internet commerce, websites, ATM machines, stock markets or brokers, car rental companies, etc. are all considered "transaction processors" or "stores." In some instances, the establishment may be both a store and a financial institution, e.g., stock brokers.

Figure 1:
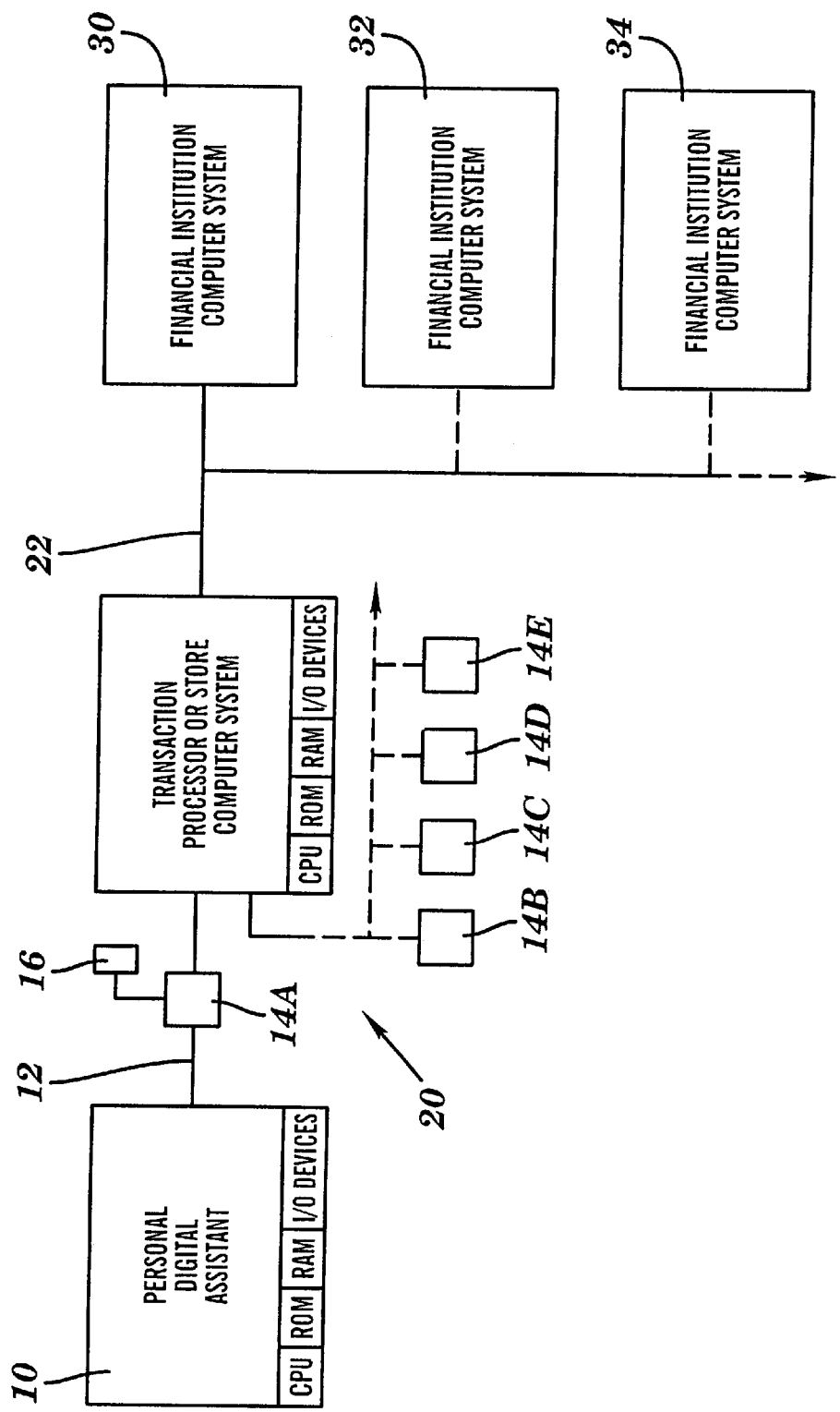
FIG. 1 shows a representative hardware environment for practicing the present invention.

Referring to FIG. 1, a representative hardware environment for practicing the present invention is depicted that illustrates a typical hardware configuration of a PDA based financial transaction system in accordance with the subject invention. The system includes a personal digital assistant (PDA) 10 such as an IBM Workpad®. PDA 10 is communicative via mechanism 12 to a transaction processor's or store's computer system 20 and, in particular, to any one of a number of communication ports or kiosks 14A, 14B, 14C, 14D, 14E, etc. that may be positioned anywhere throughout a store. Communication mechanism 12 can take a variety of forms that allow electronic communication. For instance, wiring. If PDA 10 has wireless communication capabilities, then communication mechanism 12 may include a compatible receiver/transmitter 16, e.g., an infra-red data communication port.

Store computer system 20 would include a CPU, ROM, RAM and assorted input/output devices. Store computer system 20 would also include networked kiosks 14A–14E. Store computer system 20 can also electronically connect, e.g., via modem or wide area system, to any number of financial institution computer systems 30, 32, 34 in which the PDA user and/or store has at least one account.

Figure 2:
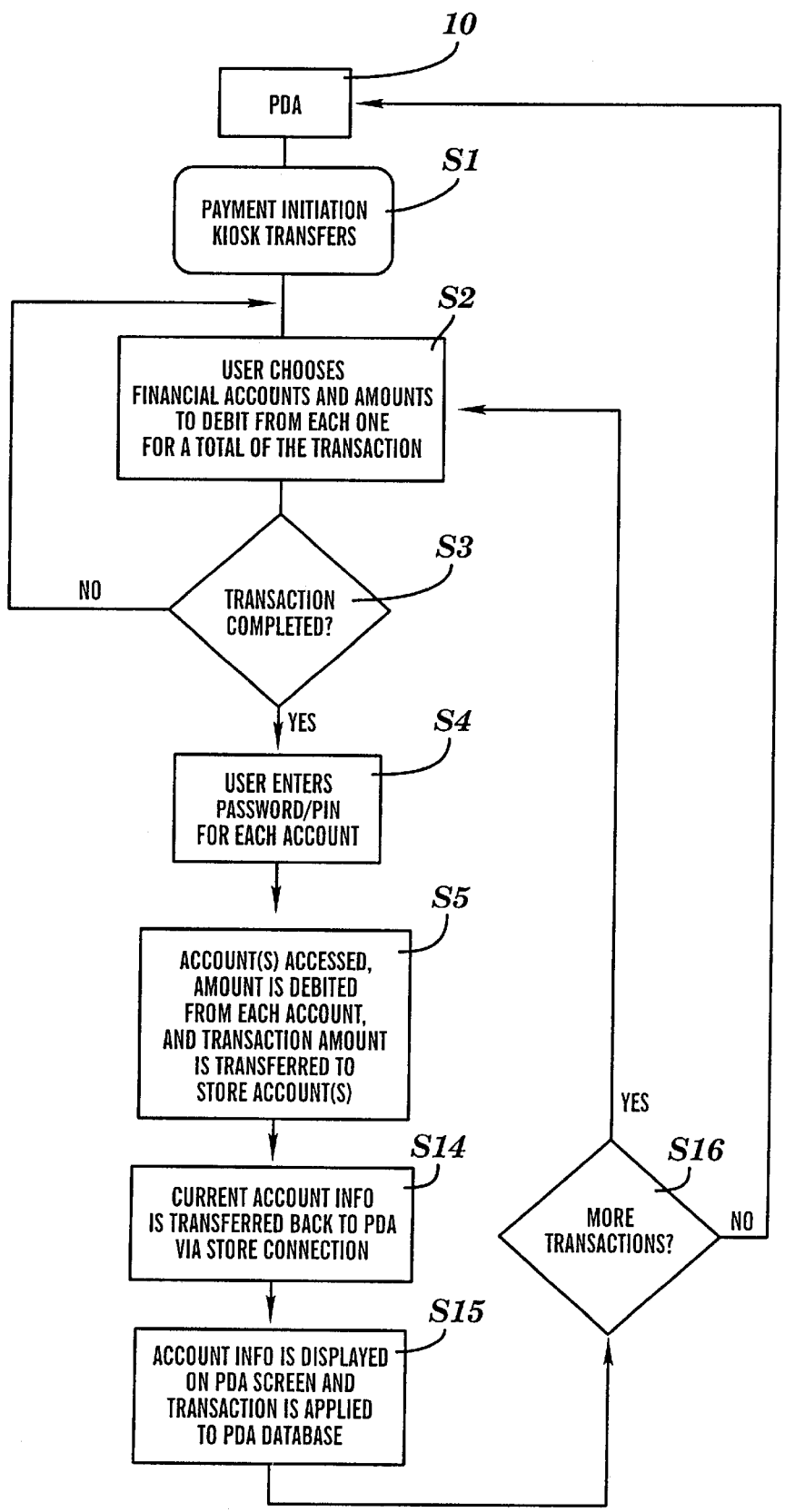
FIG. 2 shows a flow diagram of the overall process in accordance with the present invention.
Figure 3:
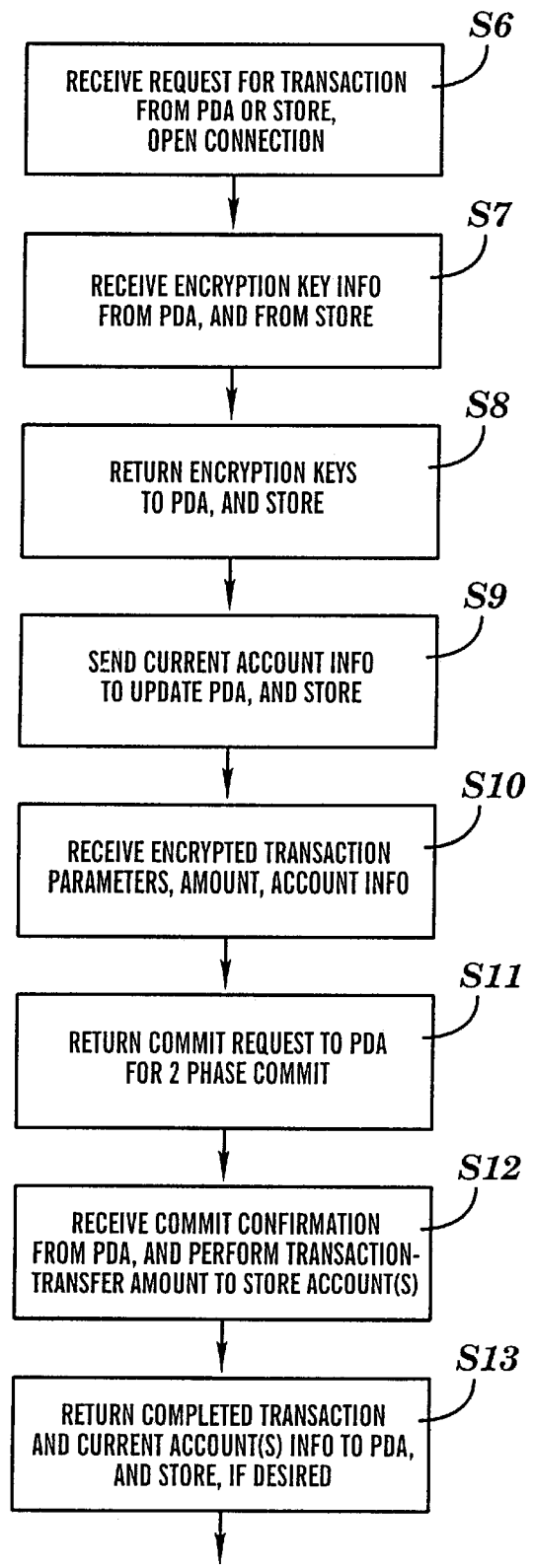
FIG. 3 shows a flow diagram of a financial institution processes in accordance with the present invention.

Turning to FIGS. 2–3, the overall processes involved with the present invention are illustrated. In step S1 of FIG. 2, PDA 10 initiates payment transfer at a conveniently located kiosk 14A–14E in the store. That is, PDA 10 is electronically communicative with store computer system 20 via wired or wireless communication via kiosk 14A–14E. At this point, payment information such as the cost of the product or services is entered. This information may be inputted into either PDA 10, or store computer system 20 directly via kiosk 14A–14E, in a number of ways. For instance, the price can be entered via a keyboard or more preferably via conventional bar code reader scanning. Once a final financial transaction total has been obtained, it is reported to the PDA 10 user, i.e., if inputted into a kiosk 14A–14E, kiosk 14A–14E transfers the transaction amount to PDA 10.

In step S2, the PDA user chooses the financial account or accounts and amount to debit from each to cover the amount of the financial transaction. The financial account(s) can be at a single financial institution or a number of financial institutions. The selections would be presented on the output device of PDA 10 and selectable by the user as desired. For instance, PDA 10 may include a touch screen, a screen with mouse, a pen-based system, a keypad, or voice recognition system, etc., for item selection by the user. Input of amounts to be debited to each financial account could be provided with the same selection mechanisms.

In step S3, a determination as to whether the financial transaction amount has been covered by the selections is performed. If the transaction is incomplete, the process loops until selections are made by the PDA user to cover the total amount of the financial transaction. If the final transaction total has been covered by the selections, the process proceeds to step S4 where a user enters an account access approval indication such as passwords, personal identification numbers (PIN), voice recognition approval, etc., for each account selected to be debited. The store may also have in memory an account access approval indication for each of its accounts that would be accessed for transfer to the respective financial institution.

In step S5, account accessing and communication processes with financial institution computer system(s) 30, 32, 34, etc. by an executing computer system, are illustrated. The financial institution computer systems 30, 32, 34, etc. access is determined, in part, by which financial institution accounts the PDA user designates to be debited and also by which financial institution accounts the store designates to access. For example, if the store and PDA user have accounts at the same financial institution, a minimum of two accounts will be accessed, or if the store and PDA user each designate more than one account at more than one financial institution, a minimum of four accounts may be accessed. Communication with each financial institution is to be in parallel such that simultaneous electronic financial transactions can occur. It is important to note, however, that membership in standardized financial transaction programs, e.g., CIRRUS®, MAC®, NYCE®, etc., could reduce the necessary number of financial institutions accessed.

The executing computer system may be either store computer system 20, PDA 10 or financial institute computer 30, 32, 34, etc., i.e., software execution for the actual financial transaction may take place in any system. Preferably, however, the executing computer system would be either financial institute computer system 30, 32, 34, etc. or store computer system 20 based on their probable higher storage capacity and performance parameters as compared to PDA 10. Most preferably, store computer system 20 is the executing computer system.

Referring to FIG. 3, the details of step S5 are illustrated. At step S6, financial institution computer system 30, 32, 34 receives a request for transaction from the executing computer system, e.g., PDA 10 or store computer system 20. This request(s) would include the inputted account access approval indications for each account to be accessed. As is conventional, all information communicated is encrypted. For instance, a 128 bit encryption key, dynamic encryption system (DES), etc. can be used to assure security. Alternatively, a secure virtual private network system (VPN) is also possible.

In step S7, financial institution computer system(s) 30, 32, 34 receive encryption keys from PDA 10 and store computer system 20. In step S8, the encryption keys are returned or transmitted to PDA 10 and store computer system 20.

In step S9, the current account(s) information is transmitted to PDA 10. This information advantageously would include at least current account(s) balance(s) and possibly all past transactions, i.e., account transaction history, which may or may not have been recorded by the PDA user. If account transaction history is desired, the number of days, weeks, months, etc. of history to be obtained can be set by the PDA user. Hence, the user can be apprized of current account balances and, if desired, determine paper transactions that have not yet cleared by reviewing the account transaction history. These provisions allow the PDA user to have the most up to date information before completing any final transactions. In a preferred embodiment, PDA 10 includes a financial account tracking database that is used to maintain and track financial accounts activity and balances. This database would be updated by the current account(s) information. However, it is also possible that at the PDA user's choosing (e.g., for security reasons), PDA 10 would not have information stored thereon and all account information would be transferred from the financial institution(s) upon use. In this case, PDA 10 would act as a terminal. Information regarding a store account(s) can also be sent to store computer system 20, if desired.

In step S10, the encrypted transaction parameters are received by financial institution computer system(s) 30, 32, 34. Transaction parameters may include, for example, transaction amount, account information, type of transaction (e.g., debit, transfer, credit), etc. Further, for some transactions, such as those requiring financial status verification (e.g., mortgages, car loans, etc.), other PDA user account information could be transferred to the store.

In step S11, a return commit request is sent to PDA 10 for a two-step or two-phase transaction committal from the PDA user. It should be recognized that the committal does not necessarily have to require two phases and may take the form of any committal indication desired by the PDA user, store and/or financial institution. For instance, a password or PIN, voice recognition, handwriting recognition, alphanumeric signal, etc. can be used.

In step S12, the financial transaction is performed. More specifically, the committal confirmation from PDA 10 is received and the financial transaction is performed. That is, the amount(s) selected from each financial account(s) of the PDA user to cover the amount of the financial transaction is transferred to the designated store account(s).

Next, in step S13, a transmittal from each financial institution to PDA 10 of updated information regarding each financial account is provided. In particular, a completed transaction notification is sent back to PDA 10 with the current account(s) information of the PDA user. After step S13, connection between store computer system 20 and the financial institution computer system(s) 30, 32, 34 can be discontinued.

Returning to FIG. 2, the overall process continues with step S14 where current account(s) information is transferred back to PDA 10 via store computer system 20 connection with PDA 10, assuming store computer system 20 is the executing computer. Otherwise, current account(s) information is sent directly to PDA 10. In step S15, the account(s) information is displayed on PDA 10 and the financial transaction is applied to a PDA database to update its records if PDA 10 has such capabilities. Hence, an automatic account register can be created. In step S16, the PDA user is queried as to whether more transactions are desired. If yes, the system loops back to step S2. Otherwise, the process is completed.

As an additional last step (not shown), an encrypted receipt could be sent to PDA 10 for further record keeping and presentation to a store representative prior to departure. As an alternative, a receipt could also be printed at kiosks 14A–14E for presentation to a store representative upon departure or at a pick up area within the store.

The method and process of the subject invention allow access to financial account(s) with immediate updated feedback from the financial institution(s) accessed. This allows the user to access one account or more than one account at one time, if necessary, and immediately see updated account balances on PDA 10. For example, if a user were buying a $1000 television, $500 could be debited to a checking account, $200 to a savings account, and $300 to a Visa account simultaneously. The balances of each account would be presented to the PDA user prior to completion of the transactions and after completion of the transactions. The user therefore receives more accurate account information. Additionally, prior to proceeding with a financial transaction, the PDA user is provided with current financial account information so as to prevent overdrafts. A transaction processor or store, such as a retail institution, would receive immediate payment for goods or services. Further, the transaction processor or store could potentially eliminate the need for checkout clerks or other service representatives other than someone to check receipts of a PDA user upon departure from the store. Alternatively, paper receipts could be eliminated entirely, for example, by providing an electronic receipt displayed on the PDA for presentation to a store representative upon departure. Hence, the subject invention could drastically decrease store operation costs.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

For instance, the invention can be implemented as set(s) of instructions (i.e., a software program) resident in the read only memory (ROM) of the executing computer system, e.g., PDA 10, store computer system 20 or financial institution computer system 30, 32, 34, etc. Alternatively, the set of instructions can be segmented between computer systems 10, 20, 30, etc. as necessary.

Until required, the set of instructions may also be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area system or a wide area system, such as the Internet, when desired by the user. For instance, the set(s) of instructions may be stored in financial institution computer system(s) 30, 32, 34, etc. If the Internet is used, the set(s) of instructions can be transferred directly to the executing computer system, i.e., PDA 10 or store computer system 20, as necessary. One skilled in the art would appreciate that the physical storage of the set(s) of instructions physically changes the medium upon which it is stored electrically, magnetically, or chemically so that the medium carries computer readable information.

Furthermore, the teachings of the present invention of immediately updating a PDA financial account database after a financial transaction may be applied in circumstances other than a debiting-type financial transaction without limitations. For instance, the present invention may be used for account transfers, e.g., transferring more funds between accounts or to a smart card. Transfers could occur prior to a debiting financial transaction, e.g., after the PDA user receives the current account information, or without a debiting financial transaction occurring. Further, the present invention could be used for situations where the establishment is both a financial institution and store as defined herein, e.g., a sale of stock by the PDA user, with transfer of proceeds to other accounts at the stock brokers or elsewhere.

We claim:

1. A method comprising the steps of:

identifying a product to be purchased;

accessing at least two financial accounts, each of the accounts having at least one of funds and credit for the purchase of the product, at at least one financial institution using a personal digital assistant;

performing at least one financial transaction during accessing using the personal digital assistant; and transmitting from each financial institution to the personal digital assistant updated information regarding each financial account.

2. The method of claim 1, further comprising:

entering into a store computer a price that a buyer will pay to purchase the product;

automatically providing to the buyer a receipt for the payment of the Price, said providing of the receipt being performed after the at least one financial transaction has been completed and being not performed by a human; and releasing the product to the buyer if the buyer presents such receipt upon removal of the product from the store.

3. The method of claim 1, wherein the step of accessing includes transmitting an account access approval indication to the at least one financial institution for each account from the personal digital assistant.

4. The method of claim 1, wherein the step of accessing includes accessing a store financial account at a store financial institution.

5. The method of claim 4, further including transmitting an account access approval indication to the financial institution for the store financial account.

6. The method of claim 1, further comprising the step of displaying the updated information for each account on the personal digital assistant.

7. The method of claim 1, wherein the step of accessing includes the personal digital assistant communicating with the financial institution via a store computer system.

8. The method of claim 7, wherein the step of transmitting includes transmitting the updated information to the personal digital assistant via the store computer system.

9. The method of claim 2, further comprising the step of entering a transaction amount into one of the personal digital assistant and the store computer system, wherein the transaction amount includes the price the buyer will pay for the product.

10. The method of claim 9, wherein the step of entering the price includes scanning a bar code.

11. The method of claim 1, wherein the step of identifying includes scanning the product's bar code.

12. The method of claim 9, wherein the step of accessing includes transmitting from the financial Institution to the personal digital assistant at least one of, current account balances account transaction history and information for updating a database of the personal digital.

13. The method of claim 1, wherein the step of performing a financial transaction includes transferring a transaction amount to a store account.

14. The method of claim 2, wherein the step of entering the price includes scanning the product's bar code.

15. The method of claim 2, wherein the receipt provided to the buyer is an encrypted receipt.

16. The method of claim 1, wherein the step of accessing a financial account requires at least one transaction approval indication from the personal digital assistant.

17. A financial transaction system comprising:

a hand held microcomputer electronically communicative with a store computer, the store computer being electronically communicative with at least one financial institution computer;

means for executing at least two simultaneous electronic financial transactions between at least two financial accounts of the user of the hand held microcomputer at the at least one financial institution and a store account, and for immediately providing the hand held microcomputer with updated account information after the electronic financial transactions have been completed for each account.

18. A system for performing a financial transaction at a store, the system comprising:

a) a store computer communicative with a store financial institution computer and a hand held computer user financial institution computer; and b) a hand held computer having:

i) means for communicating with the store computer;

ii) means for initiating a financial transaction between the hand held computer user financial institution and the store financial institution computer via the store computer; and iii) means for receiving financial transaction and account details from the hand held computer user financial institution computer via the store computer;

means for automatically providing to the user an encrypted receipt recording the financial transaction and for presentation by the user upon removal of a product from the store.

19. A store computer system for performing a financial transaction at a store with a hand held computer, the system comprising:

means for communicating with a financial institution of the store and with at least one financial institution of the hand held computer user;

means for communicating with, and for performing at least two approximately simultaneous electronic financial transactions between at least two financial accounts of the user of the hand held computer at the at least one financial institution and a store account based on input from, the hand held computer; and means for transmitting financial transaction and updated financial account information from the financial institution of the hand held computer user to the hand held computer.

20. A program storage device readable by a machine, tangibly embodying a program of instructions executable by the machine to perform the method steps for executing a financial transactions between computer systems, the method steps comprising:

a) accessing at least two financial accounts of a user of a personal digital assistant and a store account at at least one financial institution using the personal digital assistant;

b) performing at least one financial transaction during accessing using the personal digital assistant; and c) transmitting from each financial institution to the personal digital assistant updated information regarding each financial account.

21. The method of claim 1, wherein the receipt provided to the buyer is an electronic receipt displayed on the PDA for presentation to a store representative upon the buyer's departure from the store.

22. The method of claim 1, wherein the receipt provided to the buyer is a printed receipt for presentation to a store representative upon the buyer's departure from the store.

23. The method of claim 1, wherein the receipt provided to the buyer is an encrypted receipt for presentation at a product pick up area of the store.

24. The method of claim 22, wherein the printed receipt is printed at a kiosk within the store.

* * * * *

UNITED STATES PATENT AND TRADEMARK OFFICE
CERTIFICATE OF CORRECTION

PATENT NO.   : 6,305,603 B1
DATED        : October 23, 2001
INVENTOR(S)  : Grunbok, Jr. et al.

It is certified that error appears in the above-identified patent and that said Letters Patent is hereby corrected as shown below:

Column 10,
Lines 1-11, should read as follows:

21. The method of claim 2, wherein the receipt provided to the buyer is an electronic receipt displayed on the PDA for presentation to a store representative upon the buyer's departure from the store.

22. The method of claim 2, wherein the receipt provided to the buyer is a printed receipt for presentation to a store representative upon the buyer's departure from the store.

23. The method of claim 2, wherein the receipt provided to the buyer is an encrypted receipt for presentation at a product pick up area of the store.

Signed and Sealed this

Seventeenth Day of June, 2003

JAMES E. ROGAN
*Director of the United States Patent and Trademark Office*